(12) United States Patent
Fremont

(10) Patent No.: US 11,598,466 B2
(45) Date of Patent: Mar. 7, 2023

(54) FLUID CONNECTOR WITH RESEALABLE MEMBRANE VALVE

(71) Applicant: Oetiker NY, Inc., Lancaster, NY (US)

(72) Inventor: Bradley C. Fremont, Tonawanda, NY (US)

(73) Assignee: Oetiker NY, Inc., Lancaster, NY (US)

( * ) Notice: Subject to any disclaimer, the term of this patent is extended or adjusted under 35 U.S.C. 154(b) by 0 days.

(21) Appl. No.: 17/253,168

(22) PCT Filed: Jun. 25, 2018

(86) PCT No.: PCT/US2018/039333
§ 371 (c)(1),
(2) Date: Dec. 17, 2020

(87) PCT Pub. No.: WO2020/005198
PCT Pub. Date: Jan. 2, 2020

(65) Prior Publication Data
US 2021/0278023 A1    Sep. 9, 2021

(51) Int. Cl.
*F16L 37/40* (2006.01)
*F16L 37/12* (2006.01)

(52) U.S. Cl.
CPC .......... *F16L 37/40* (2013.01); *F16L 37/1225* (2013.01)

(58) Field of Classification Search
CPC . F16L 29/02; F16L 29/04; F16L 37/28; F16L 37/30; F16L 37/38; F16L 37/40; F16K 15/145
USPC ...................................................... 251/149.1
See application file for complete search history.

(56) References Cited

U.S. PATENT DOCUMENTS

| | | | | |
|---|---|---|---|---|
| 2,775,256 | A * | 12/1956 | Hanson | F16L 29/02 137/538 |
| 2,805,089 | A * | 9/1957 | Hansen | F16L 37/088 285/317 |
| 3,788,598 | A * | 1/1974 | German et al. | F16L 37/23 251/149.6 |
| 3,922,011 | A * | 11/1975 | Walters | F16L 37/088 285/902 |
| 4,007,909 | A | 2/1977 | Buseth et al. | |
| 4,732,192 | A * | 3/1988 | Shen | F16L 29/02 251/339 |
| 4,902,043 | A * | 2/1990 | Zillig | F16L 37/0987 285/379 |
| 6,482,181 | B1* | 11/2002 | Racenet et al. | F16K 15/147 604/167.06 |

(Continued)

FOREIGN PATENT DOCUMENTS

DE   3631812   3/1987
DE   2306060   4/2011
(Continued)

*Primary Examiner* — Kevin F Murphy
(74) *Attorney, Agent, or Firm* — Harter Secrest & Emery LLP; Michael Nicholas Vranjes

(57) ABSTRACT

An O-ring membrane valve, including an O-ring, and a resealable membrane connected to the O-ring, the resealable membrane including a first surface, a second surface, and a slit extending from the first surface to the second surface. The O-ring membrane valve may be assembled with a fluid connector, the fluid connector including a body, having a first through-bore and a first groove arranged circumferentially within the first through-bore.

11 Claims, 15 Drawing Sheets

(56) References Cited

U.S. PATENT DOCUMENTS

| | | | | |
|---|---|---|---|---|
| 6,848,722 | B2* | 2/2005 | Jeory | F16L 29/02 285/82 |
| 8,932,275 | B2* | 1/2015 | Smith | A61M 39/0606 604/513 |
| 8,968,249 | B2* | 3/2015 | Smith et al. | A61B 17/3462 604/167.06 |
| 10,463,395 | B2* | 11/2019 | Reid et al. | A61B 17/3423 |
| 10,772,661 | B2* | 9/2020 | Kleyman | A61B 17/3498 |
| 2004/0066008 | A1 | 4/2004 | Smith | |
| 2004/0218020 | A1* | 11/2004 | Shibata et al. | B41J 2/17596 347/85 |
| 2006/0289824 | A1* | 12/2006 | Wincek | F16K 7/126 251/331 |
| 2012/0055555 | A1* | 3/2012 | Saint-Paul et al. | F16K 7/14 251/12 |
| 2012/0211095 | A1* | 8/2012 | Peck et al. | F16K 15/145 137/511 |
| 2017/0254453 | A1 | 9/2017 | Fremont et al. | |

FOREIGN PATENT DOCUMENTS

| | | |
|---|---|---|
| JP | 2001289381 A | 10/2001 |
| WO | WO2002/041795 | 5/2002 |
| WO | WO2016158107 A1 | 10/2016 |

* cited by examiner

US 11,598,466 B2

FLUID CONNECTOR WITH RESEALABLE MEMBRANE VALVE

CROSS-REFERENCE TO RELATED APPLICATIONS

The present application is the United States National Stage Application pursuant to 35 U.S.C. § 371 of International Patent Application No. PCT/US2018/039333, filed on Jun. 25, 2018, which application is incorporated herein by reference in its entirety.

FIELD

The present disclosure relates to a fluid connector, and, more particularly, to a fluid connector having a resealable membrane valve.

BACKGROUND

Fluid connectors are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Fluid predominantly moves between components via flexible or rigid hoses which connect to each component by fluid connectors. Such fluid connectors typically include a retaining clip or snap ring carried on the fluid connector which is adapted to snap behind a raised shoulder of a tube end form when the tube end form is fully inserted into the fluid connector. Additionally, the fluid connector typically includes a membrane which retains the fluid within the component (e.g., prevents the transmission fluid from spilling out of the transmission). When the tube end form is inserted into the fluid connector, the membrane is punctured and allows the fluid to flow into the tube end form. However, when the tube end form is removed, the membrane does not reseal. Similarly, grease plugs do not allow the holes in which they are installed to reseal quickly and easily. Rather, the grease plug needs to be fully removed from the component in which they are installed to allow grease to flow both in and out of the component.

Thus, there has been a long-felt need for a fluid connector having a resealable membrane which reseals once the tube end form is removed from the fluid connector.

SUMMARY

According to aspects illustrated herein, there is provided an O-ring membrane valve, comprising an O-ring, and a resealable membrane connected to the O-ring, the resealable membrane including a first surface, a second surface, and a slit extending from the first surface to the second surface.

According to aspects illustrated herein, there is provided a fluid connector, comprising a body, including a first through-bore, and a first groove arranged circumferentially within the first through-bore, and an O-ring membrane valve arranged in the first groove, the O-ring membrane valve including an O-ring, and a resealable membrane connected to the O-ring, the resealable membrane having a slit.

According to aspects illustrated herein, there is provided a seal membrane valve, comprising a seal, and a resealable membrane connected to the seal, the resealable membrane including a first surface, a second surface, and a slit extending from the first surface to the second surface.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
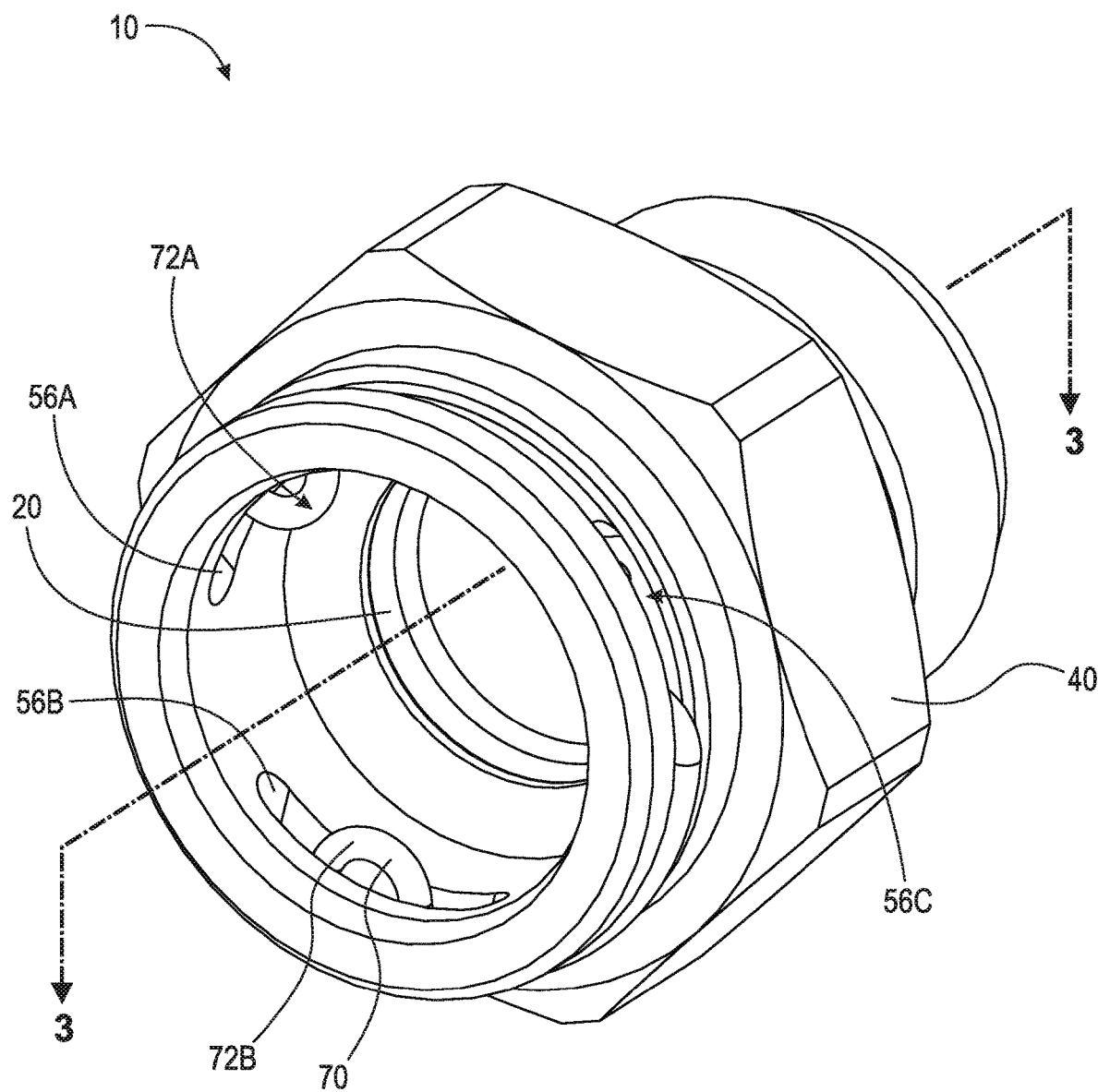
FIG. 1 is a perspective view of a fluid connector.
Figure 2:
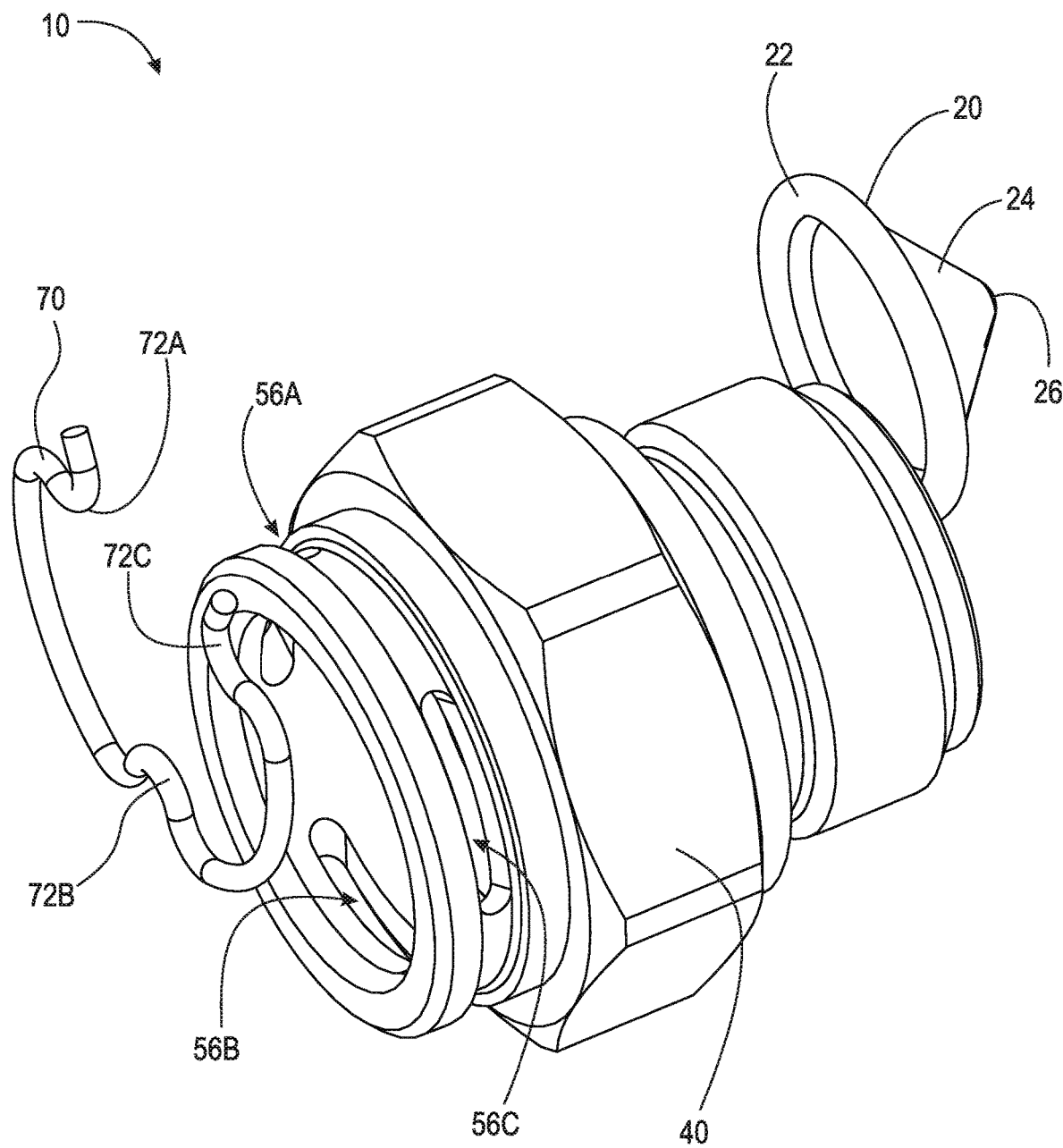
FIG. 2 is an exploded view of the fluid connector shown in FIG. 1.
Figure 3:
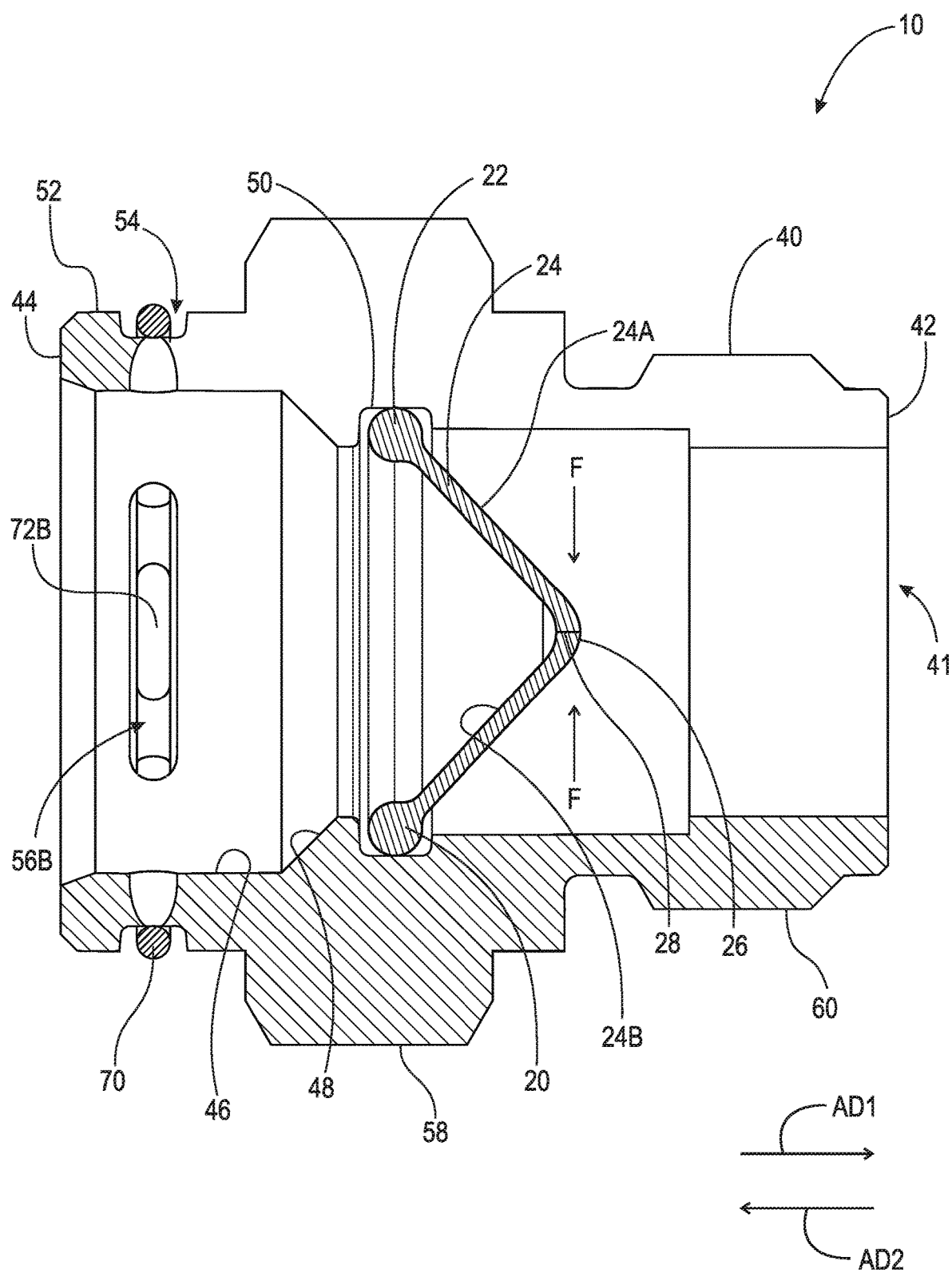
FIG. 3 is a cross-sectional view of the fluid connector taken generally along line 3-3 in FIG. 1.

Adverting now to the figures, FIG. 1 is a perspective view of fluid connector 10. FIG. 2 is an exploded view of fluid connector 10. FIG. 3 is a cross-sectional view of fluid connector 10 taken generally along line 3-3 in FIG. 1. Fluid connector 10 generally comprises O-ring membrane valve 20, body 40, and snap ring 70. The following description should be read in view of FIGS. 1-3.

O-ring membrane valve 20 comprises O-ring 22 and membrane 24. O-ring 22 is a mechanical gasket in the shape of a torus; it is a loop of elastomer with a round cross-section, designed to be seated in groove 50 and compressed during assembly between body 40 and tube end form 80, as will be discussed in greater detail below. It should be appreciated, however, that O-ring 22 can be envisioned as a seal having any geometry, such as ovular, square, rectangular, triangular, ellipsoidal, etc., suitable to provide a fluid tight seal with body 40. As such, O-ring 22 does not need to be an "O-ring" by definition, but rather may be a bordering seal to which membrane 24 connects. Membrane 24 extends radially inward from O-ring 22. Membrane 24 is generally conical in shape and comprises vertex 26. Membrane 24 further comprises slit 28 arranged at vertex 26. In some embodiments, slit 28 is linear and is capable of sealing. In some embodiments, slit 28 is nonlinear. In some embodiments, membrane 24 comprises a plurality of slits.

Body 40 comprises through-bore 41 extending from end 42 to end 44, radially inward facing surface 46, radially inward facing surface 48, groove 50, radially outward facing surface 52, hexagonal head 58, and radially outward facing surface 60. Body 40 is arranged to be connected to a component that is filled with a fluid. For example, body 40 may be connected to a transmission via radially outward facing surface 60, which may comprise external threading. Body 40 may be screwed into a threaded hole in the transmission via hexagonal head 58 (e.g., using a wrench), which is then filled with transmission fluid. Another component in which fluid connector 10, specifically body 40, may be installed into is an engine block. In this embodiment, fluid connector 10, specifically O-ring membrane valve 20, holds engine oil within the engine block. It should be appreciated that fluid connector 10 may be used in various other components, assemblies, and subassemblies in which fluid is to be contained. O-ring membrane valve 20 is arranged in body 40. Specifically, O-ring 22 is arranged in groove 50. Membrane 24 extends in axial direction AD1 towards end 42. When body 50 is secured to a component filled with fluid, for example a transmission filled with transmission fluid, the fluid pressure within the component exerts force F on surface 24B, as shown in FIG. 3. Force F causes slit 28 to seal preventing the fluid from flowing through membrane 24 in axial direction AD2.

Snap ring 70 is arranged in groove 54 in body 40. Snap ring 70 is generally a retaining ring including one or more protrusions extending radially inward. In the embodiment shown, snap ring 70 comprises protrusions 72A-C. Protrusions 72A-C extend radially inward through holes 56A-C, respectively, in groove 54. Protrusions 72A-C are arranged to engage shoulder 87, specifically, shoulder surface 88.

Figure 4:
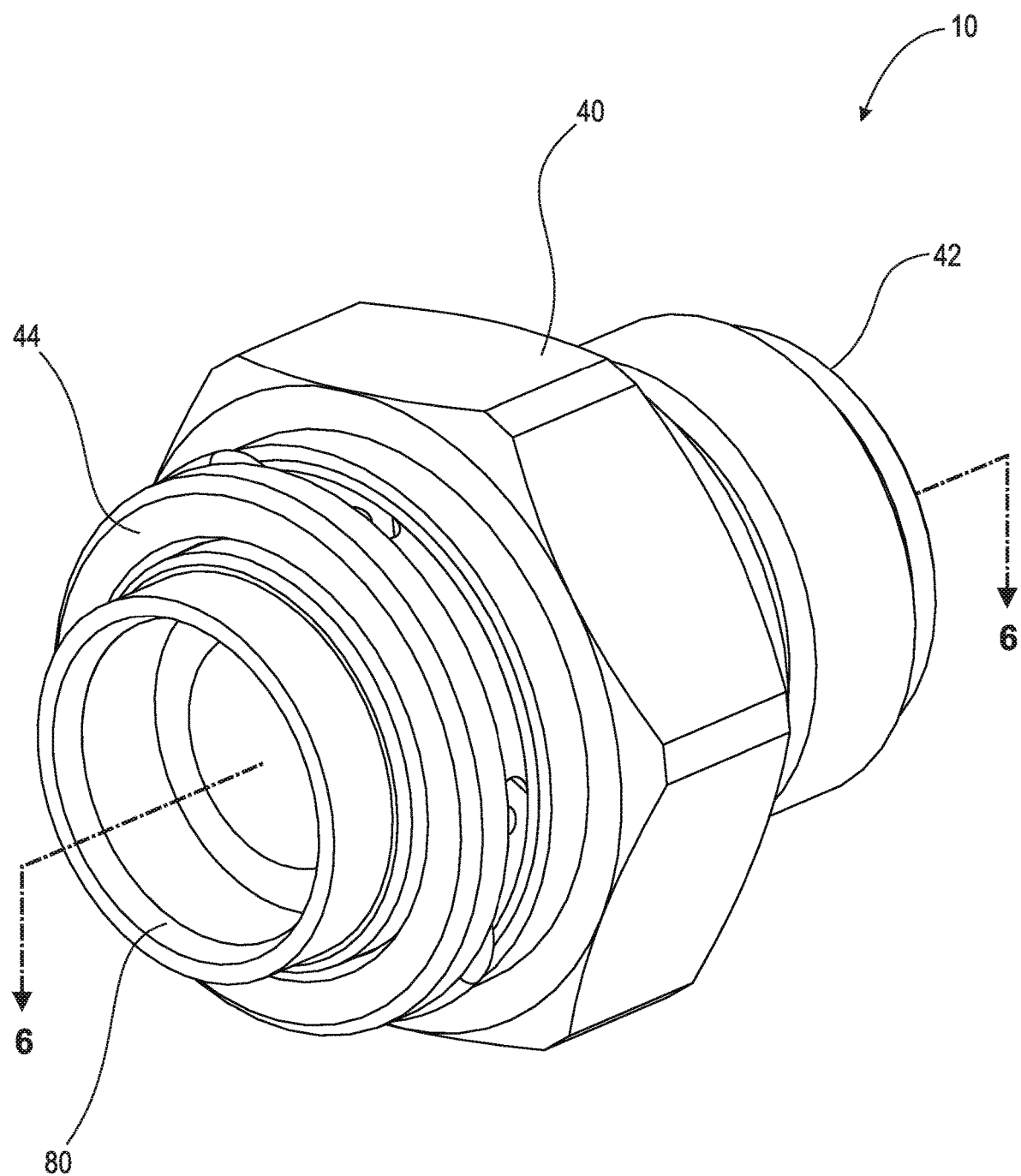
FIG. 4 is a perspective view of a fluid connector with a tube end form engaged therein.
Figure 5:
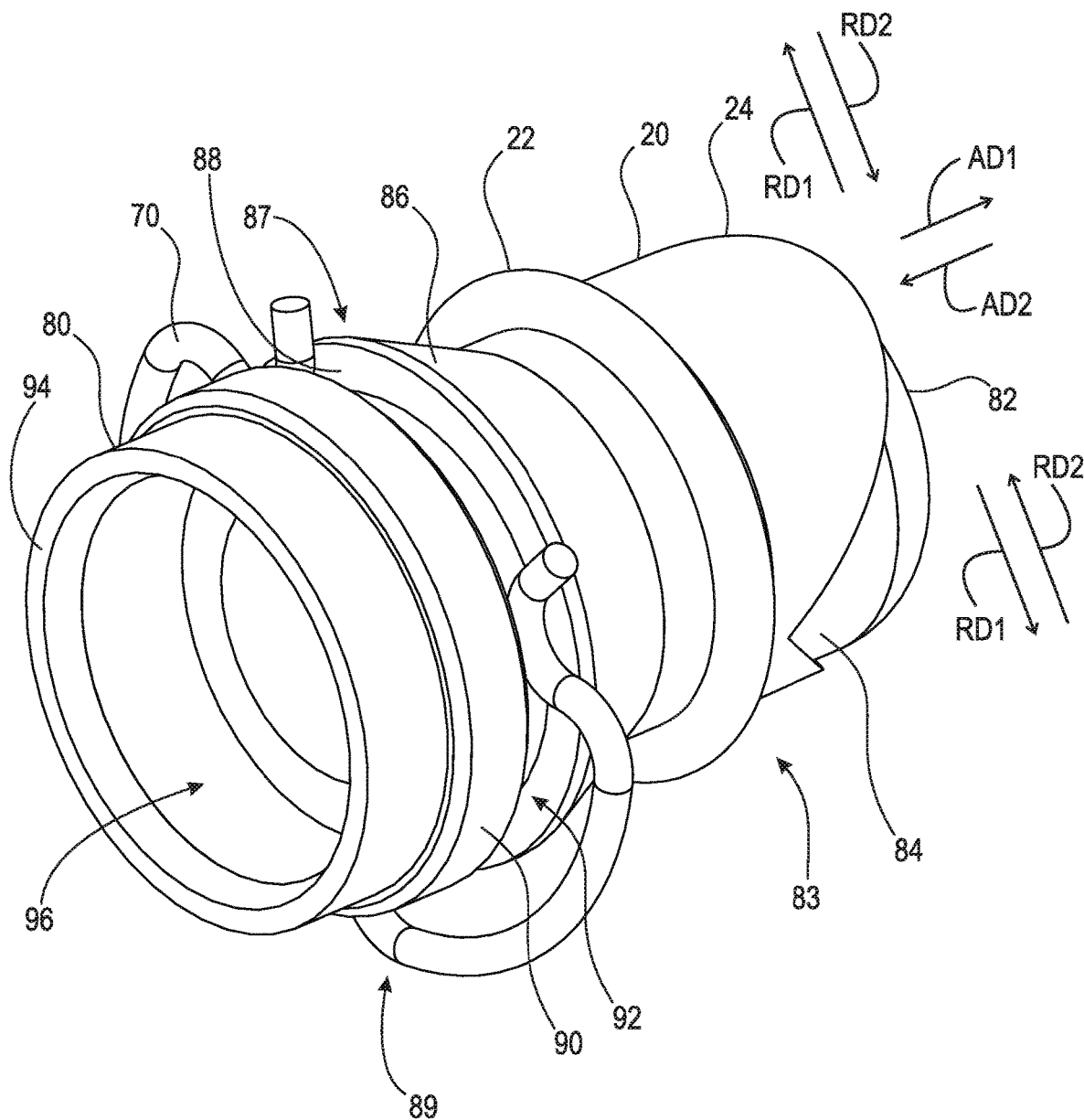
FIG. 5 is a partial perspective view of the fluid connector with the tube end form as shown in FIG. 4, with the body removed.
Figure 6:
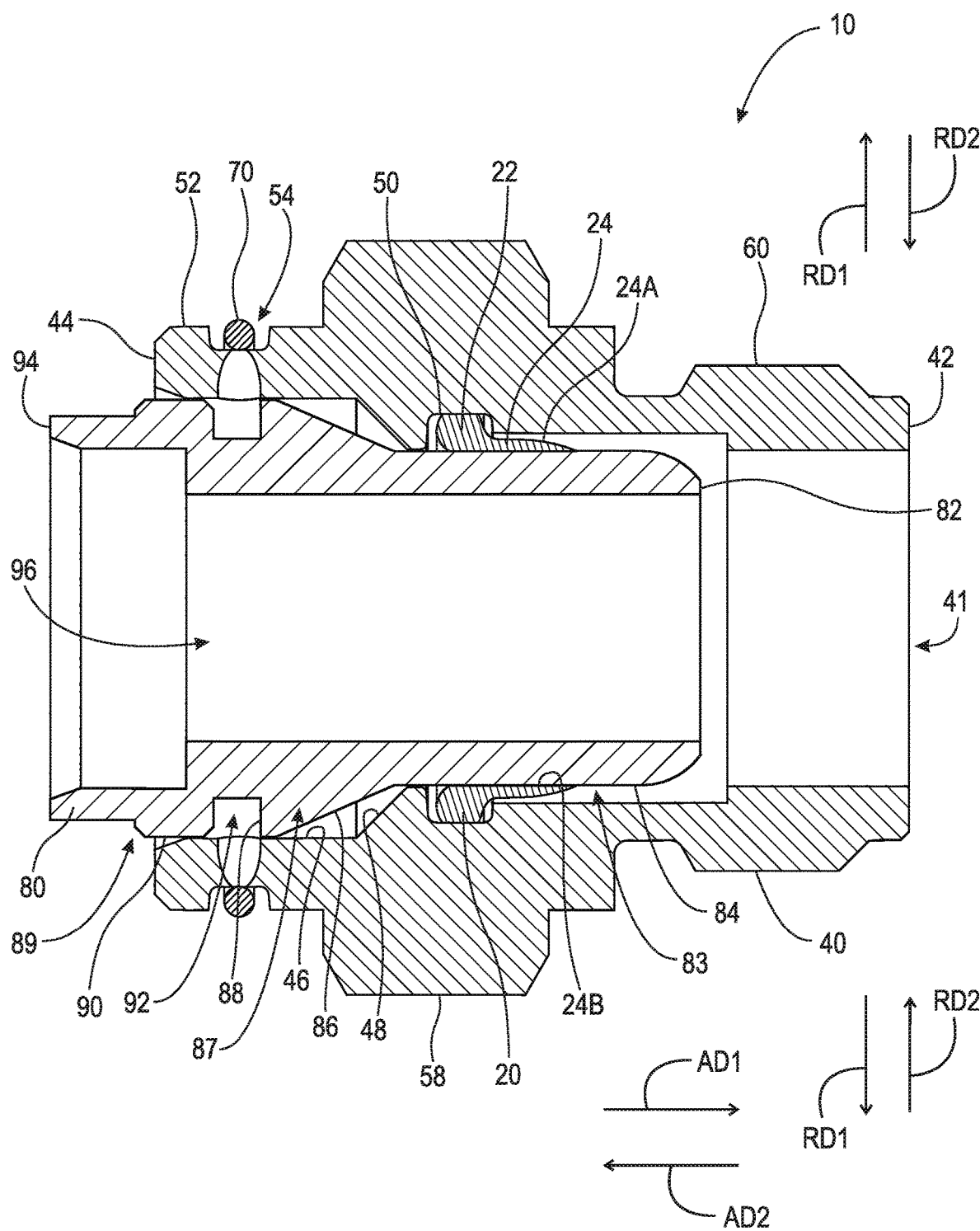
FIG. 6 is a cross-sectional view of the fluid connector with the tube end form taken generally along line 6-6 in FIG. 4.

FIG. 4 is a perspective view of fluid connector 10 with tube end form 80 engaged therein. FIG. 5 is a partial perspective view of fluid connector 10 and tube end form 80 as shown in FIG. 4, with body 40 removed. FIG. 6 is a cross-sectional view of fluid connector 10 with tube end form 80 taken generally along line 6-6 in FIG. 4. The following descriptions should be read in view of FIGS. 4-6.

Tube end form 80 comprises end 82, section 83, shoulder 87, section 89, end 94, and through-bore 96. Through-bore 96 extends through tube end form 80 from end 82 to end 94. Section 83 is arranged between end 82 and shoulder 87 and comprises radially outward facing surface 84. Radially outward facing surface 84 includes a substantially constant diameter. Shoulder 87 is arranged between section 83 and section 89 and comprises radially outward facing surface 86. Radially outward facing surface 86 is a linear conical shape and increases in diameter in axial direction AD2. Radially outward facing surface 86 may have a non-conical portion proximate groove 92, as shown in the figures. Section 89 is arranged between shoulder 87 and end 94 and comprises radially outward facing surface 90. Radially outward facing surface 90 includes a substantially constant diameter. Groove 92 arranged axially between shoulder 87 and radially outward facing surface 90. Shoulder 87 is connected to groove 92 via shoulder surface 88. Tube end form 80 is arranged to be inserted, specifically with end 82 first, into fluid connector 10. Tube end form 80, specifically shoulder 87, may utilize a straight ramp (i.e., constant linear ramp) or a variable diameter ramp profile, and is inserted into fluid connector 10 until snap ring 70 snaps over shoulder 87. It should be appreciated that tube end form 80 may be any traditional tube end form comprising a ramp profile, which extends radially outward and axially on the outer surface of the tube end form, to displace a snap ring or wire clip within the fluid connector to secure the tube end form within the fluid connector.

As shown in the figures, tube end form 80 is inserted into fluid connector 10. As tube end form 80 is displaced in axial direction AD1 and end 82 contacts membrane 24, specifically surface 24A, end 82 displaces membrane 24 in radial direction RD1 (see FIGS. 5 and 6). The displacement of membrane 24 in radial direction RD1 allows fluid from within the component, for example transmission fluid in a transmission, to flow out of the component into tube end form 80 in axial direction AD1. Specifically, insertion of tube end form 80 within fluid connector 10 opens slit 28. Additionally, as section 83 engages O-ring membrane valve 20, radially outward facing surface 84 elastically deforms O-ring 22 in radial direction RD1. Specifically, O-ring 22 is squeezed between groove 50 and radially outward facing surface 84, thus creating a fluid proof seal between body 40 and tube end form 80. This is perhaps the most important feature of the invention, namely, the combination of the O-ring having a round or circular cross-section, which performs as a gasket, and the resealable membrane, which allows for insertion and removal of tube end forms and other filling/evacuation probes (discussed in greater detail with reference to FIGS. 8-9C).

In some embodiments, insertion of tube end form 80 plastically deforms membrane 24. This means that after tube end form 80 has been fully inserted and connected to fluid connector 10, membrane 24 plastically deforms such that it cannot reseal upon removal of tube end form 80. In some embodiments, insertion of tube end form 80 does not plastically deform membrane 24. Tube end form 80 is designed to minimally elastically deform membrane 24 such that after tube end form 80 is removed, membrane 24 reseals. One having ordinary skill in the art can envision such a tube end form being similar in design to probe 110 shown in FIGS. 8-9C.

As shown in FIG. 6, tube end form 80 is fully engaged in fluid connector 10. Protrusions 72A-C are engaged in groove 92, radially outward facing surface 86 is arranged proximate radially inward facing surface 48, O-ring 22 provides a fluid seal between body 40 and tube end form 80, and membrane 40 is displaced around radially outward facing surface 40.

Figure 7A:
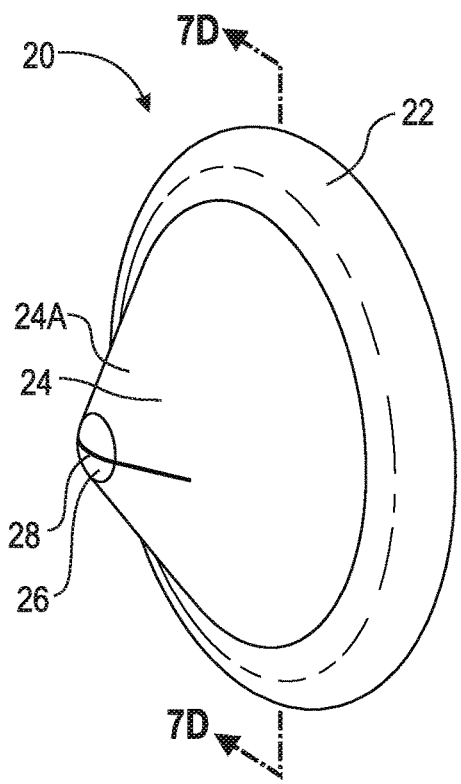
FIG. 7A is a perspective view of an O-ring membrane valve as shown in FIG. 1.
Figure 7B:
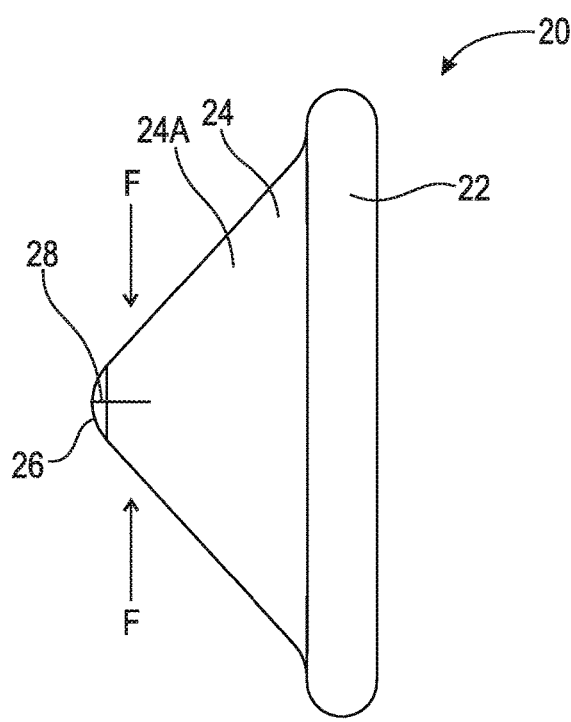
FIG. 7B is a side elevational view of the O-ring membrane valve shown in FIG. 7A.
Figure 7C:
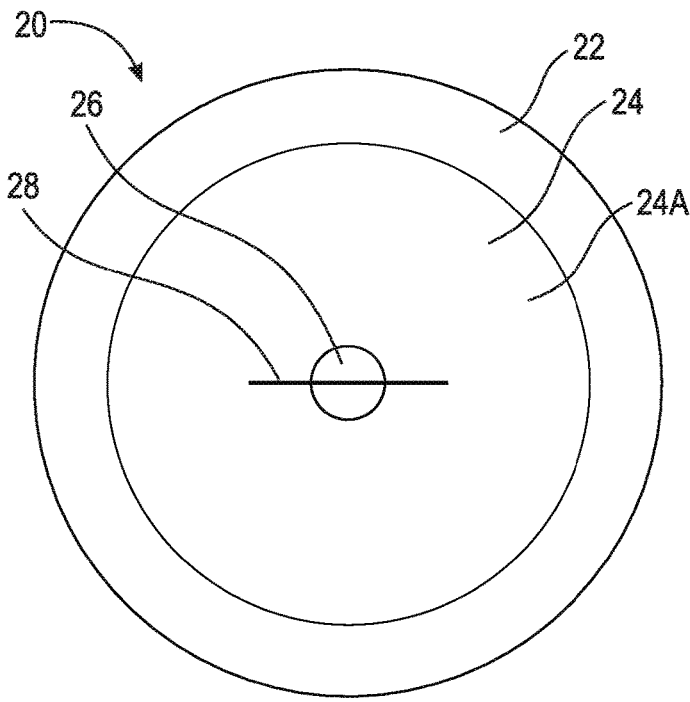
FIG. 7C is a front elevational view of the O-ring membrane valve shown in FIG. 7A.
Figure 7D:
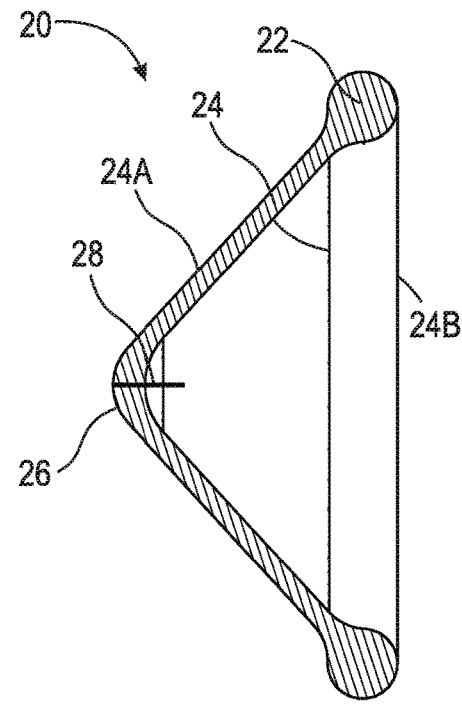
FIG. 7D is a cross-sectional view of the O-ring membrane valve taken generally along line 7D-7D in FIG. 7A.

FIG. 7A is a perspective view of O-ring membrane valve 20. FIG. 7B is a side elevational view of O-ring membrane valve 20. FIG. 7C is a front elevational view of O-ring membrane valve 20. FIG. 7D is a cross-sectional view of O-ring membrane valve 20 taken generally along line 7D-7D in FIG. 7A. The following descriptions should be read in view of FIGS. 7A-7D.

As previously described, O-ring membrane valve 20 comprises O-ring 22 and membrane 24. O-ring 22 comprises a round or circular cross-sectional geometry and acts as a mechanical gasket. O-ring 22 is arranged to be seated in groove 50 and compressed between body 40 and tube end form 80 during assembly, creating a seal at the interface. Membrane 24 comprises surface 24A, which is exposed to the fluid of the component, and surface 24B, which is arranged for contact with tube end form 80 or probe 110 (discussed in greater detail with reference to FIGS. 8-9C). Membrane 24 is generally conical and further comprises vertex 26 and slit 28. Slit 28 is generally a hole in membrane 24 at vertex 26 and is designed to seal due to force F from fluid pressure exerted on surface 24A. In some embodiments, O-ring membrane valve 20 comprises an elastomer. However, it should be appreciated that O-ring membrane valve 20 may comprise any material suitable for creating a seal between body 40 and tube end form 80, and also retaining fluid within the component as previously discussed. For example, O-ring membrane valve 20 may comprise fluorocarbon, ethylene acrylate rubber (AEM), silicon, ethylene propylene diene monomer (EPDM), or any other suitable elastically deformable material.

Figure 8A:
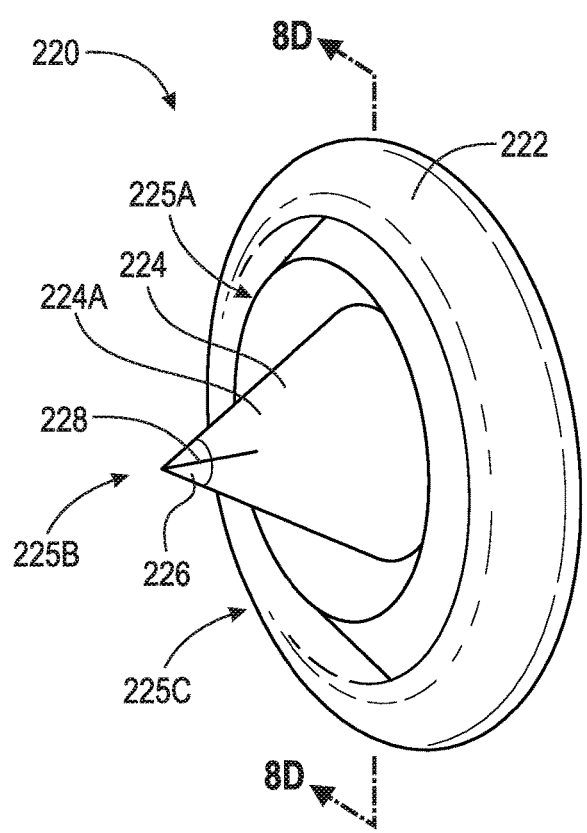
FIG. 8A is a perspective view of an O-ring membrane valve.
Figure 8B:
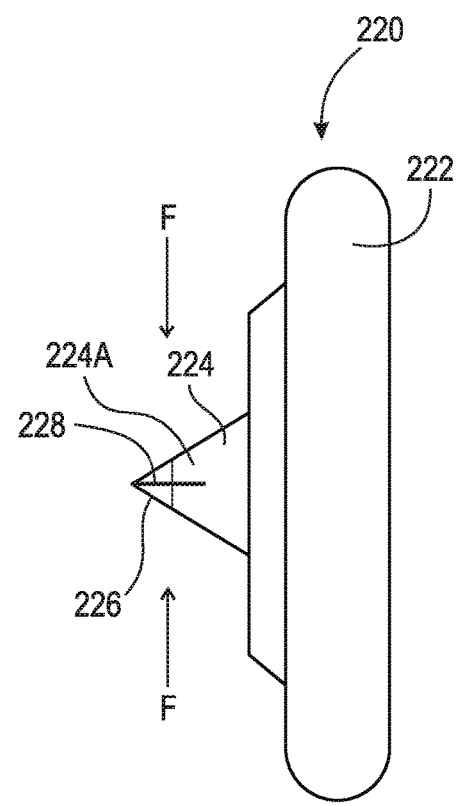
FIG. 8B is a side elevational view of the O-ring membrane valve shown in FIG. 8A.
Figure 8C:
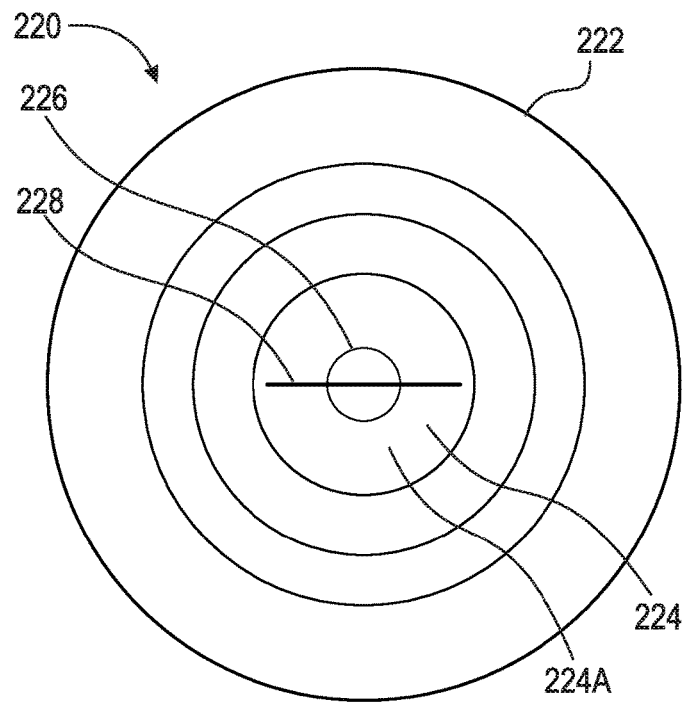
FIG. 8C is a front elevational view of the O-ring membrane valve shown in FIG. 8A.
Figure 8D:
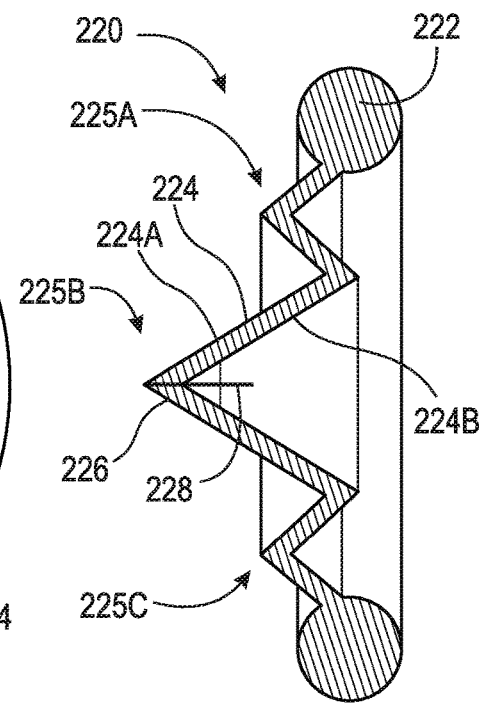
FIG. 8D is a cross-sectional view of the O-ring membrane valve taken generally along line 8D-8D in FIG. 8A.

FIG. 8A is a perspective view of O-ring membrane valve 220. FIG. 8B is a side elevational view of O-ring membrane valve 220. FIG. 8C is a front elevational view of O-ring membrane valve 220. FIG. 8D is a cross-sectional view of O-ring membrane valve 220 taken generally along line 8D-8D in FIG. 8A. O-ring membrane valve 220 comprises O-ring 222 and membrane 224. O-ring 222 is a mechanical gasket in the shape of a torus; it is a loop of elastomer with a round cross-section, designed to be seated in groove 50 and compressed during assembly between body 40 and tube end form 80. Membrane 224 extends radially inward from O-ring 222. Membrane 224 is generally formed as a bellows, namely as a pleated expansible and contractible design including one or more conical areas, and comprises vertex 226. Membrane 224 may have, for example, conical sections 225A-C, that allow slit 328 to remain closed when the outer diameter of O-ring 222 is squeezed while O-ring membrane valve 220 is assembled in body 40. Membrane 224 further comprises slit 228 arranged at vertex 226. In some embodiments, slit 228 is linear and is capable of sealing. In some embodiments, slit 228 is nonlinear. In some embodiments, membrane 224 comprises a plurality of slits.

Figure 9A:
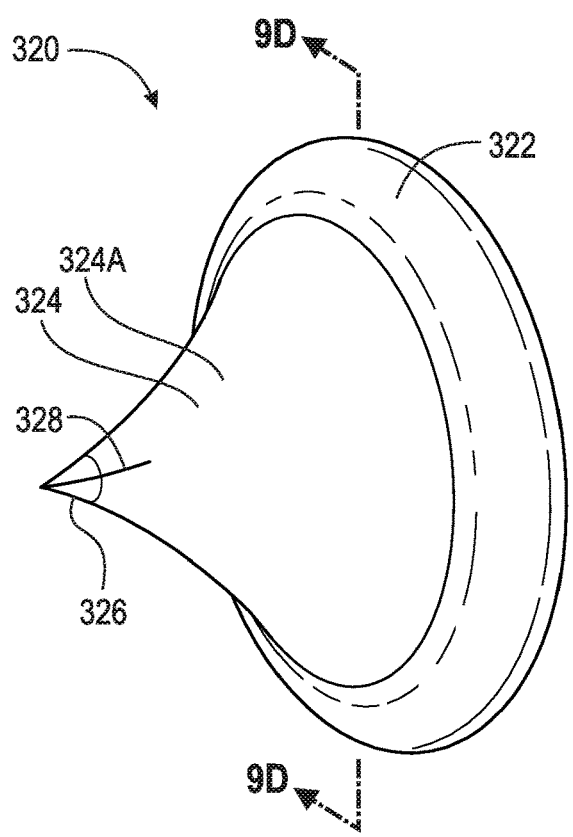
FIG. 9A is a perspective view of an O-ring membrane valve.
Figure 9B:
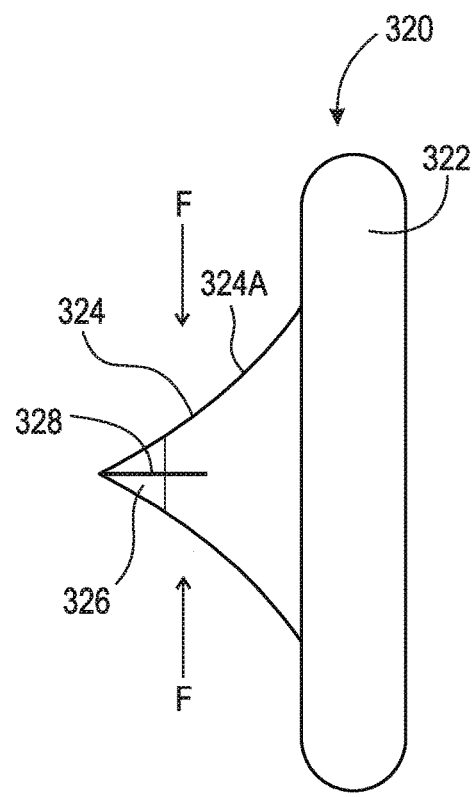
FIG. 9B is a side elevational view of the O-ring membrane valve shown in FIG. 9A.
Figure 9C:
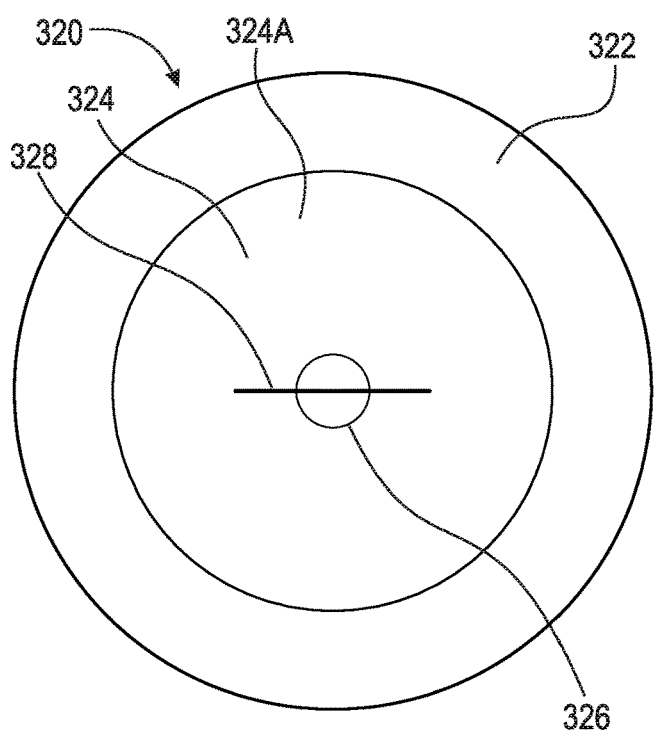
FIG. 9C is a front elevational view of the O-ring membrane valve shown in FIG. 9A.
Figure 9D:
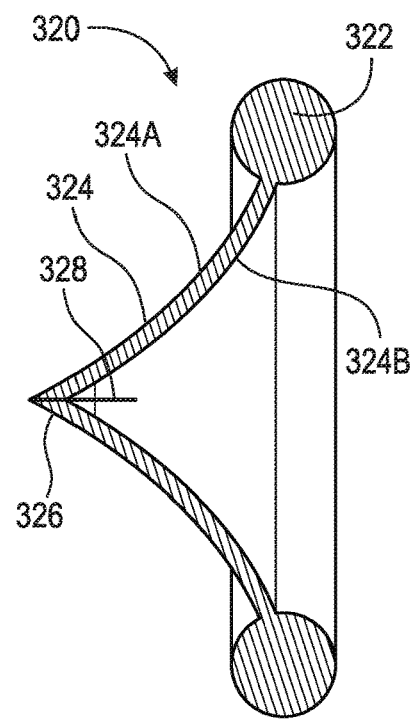
FIG. 9D is a cross-sectional view of the O-ring membrane valve taken generally along line 9D-9D in FIG. 9A.

FIG. 9A is a perspective view of O-ring membrane valve 320. FIG. 9B is a side elevational view of O-ring membrane valve 320. FIG. 9C is a front elevational view of O-ring membrane valve 320. FIG. 9D is a cross-sectional view of O-ring membrane valve 320 taken generally along line 9D-9D in FIG. 9A. O-ring membrane valve 320 comprises O-ring 322 and membrane 324. O-ring 322 is a mechanical gasket in the shape of a torus; it is a loop of elastomer with a round cross-section, designed to be seated in groove 50 and compressed during assembly between body 40 and tube end form 80. Membrane 324 extends radially inward from O-ring 322. Membrane 324 is generally formed as a conical tear drop shape, namely a conical shape with an exponential (non-linear) curvature, and comprises vertex 326. Membrane 324 further comprises slit 328 arranged at vertex 326. In some embodiments, slit 328 is linear and is capable of sealing. In some embodiments, slit 328 is nonlinear. In some embodiments, membrane 324 comprises a plurality of slits.

Figure 10A:
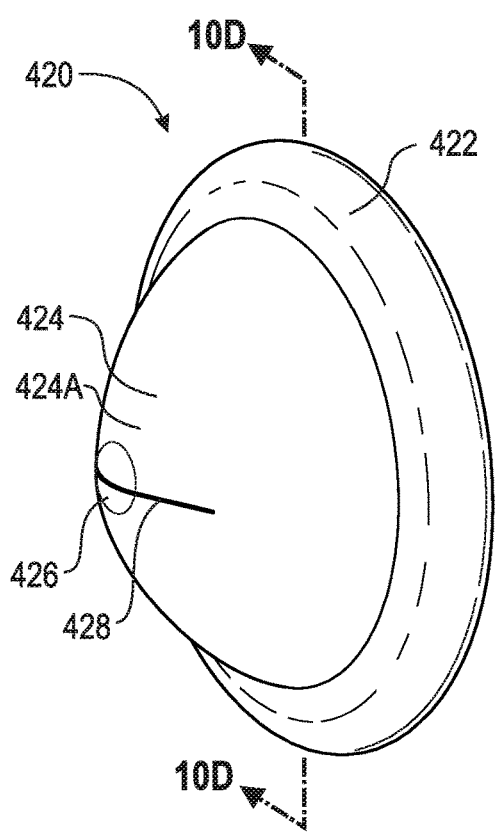
FIG. 10A is a perspective view of an O-ring membrane valve.
Figure 10B:
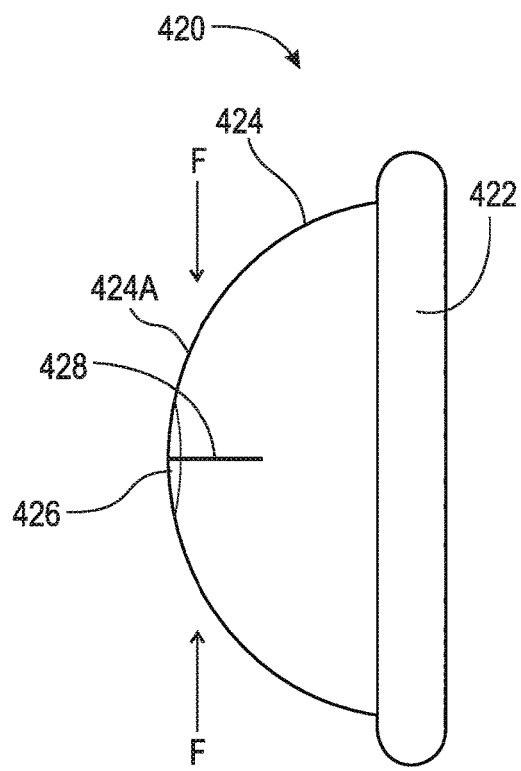
FIG. 10B is a side elevational view of the O-ring membrane valve shown in FIG. 10A.
Figure 10C:
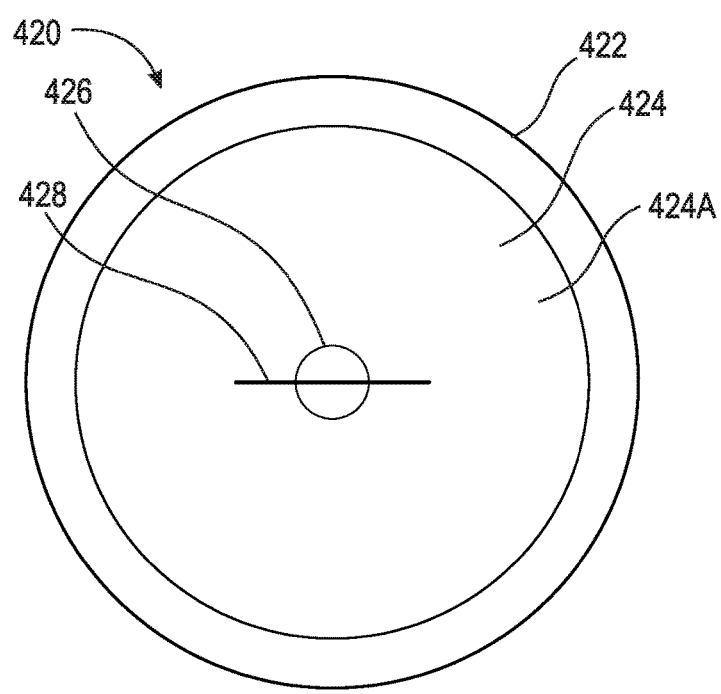
FIG. 10C is a front elevational view of the O-ring membrane valve shown in FIG. 10A.
Figure 10D:
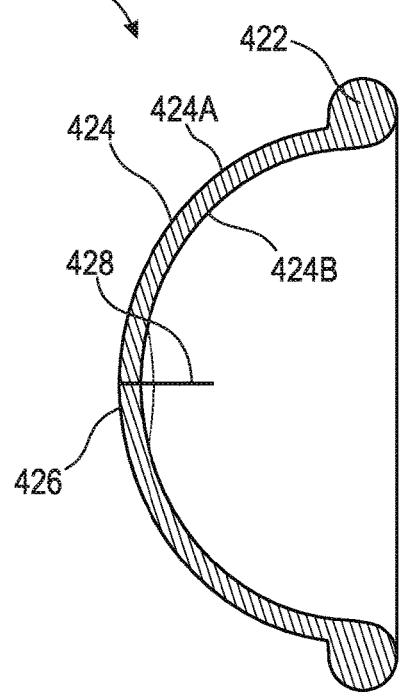
FIG. 10D is a cross-sectional view of the O-ring membrane valve taken generally along line 10D-10D in FIG. 10A.

FIG. 10A is a perspective view of O-ring membrane valve 420. FIG. 10B is a side elevational view of O-ring membrane valve 420. FIG. 10C is a front elevational view of O-ring membrane valve 420. FIG. 10D is a cross-sectional view of O-ring membrane valve 420 taken generally along line 10D-10D in FIG. 10A. O-ring membrane valve 420 comprises O-ring 422 and membrane 424. O-ring 422 is a mechanical gasket in the shape of a torus; it is a loop of elastomer with a round cross-section, designed to be seated in groove 50 and compressed during assembly between body 40 and tube end form 80. Membrane 424 extends radially inward from O-ring 422. Membrane 424 is generally dome shaped and comprises vertex 426. Membrane 424 further comprises slit 428 arranged at vertex 426. In some embodiments, slit 428 is linear and is capable of sealing. In some embodiments, slit 428 is nonlinear. In some embodiments, membrane 424 comprises a plurality of slits.

Figure 11A:
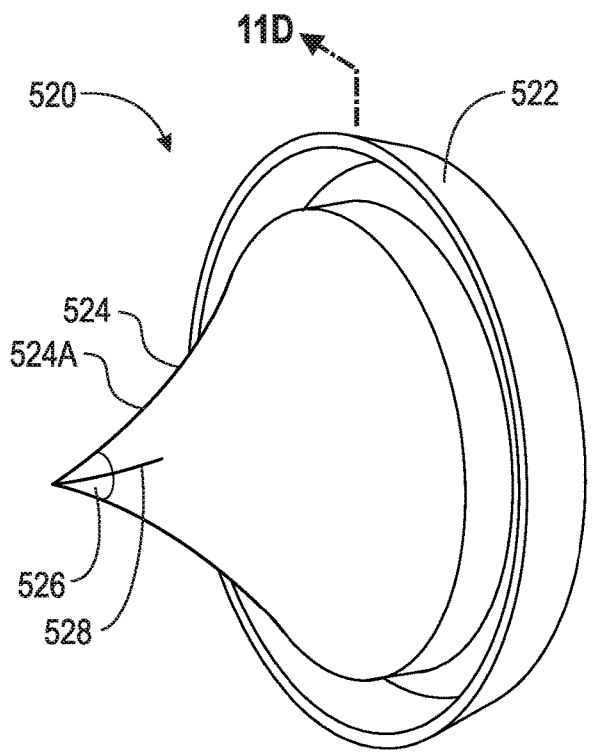
FIG. 11A is a perspective view of a u-cup membrane valve.
Figure 11B:
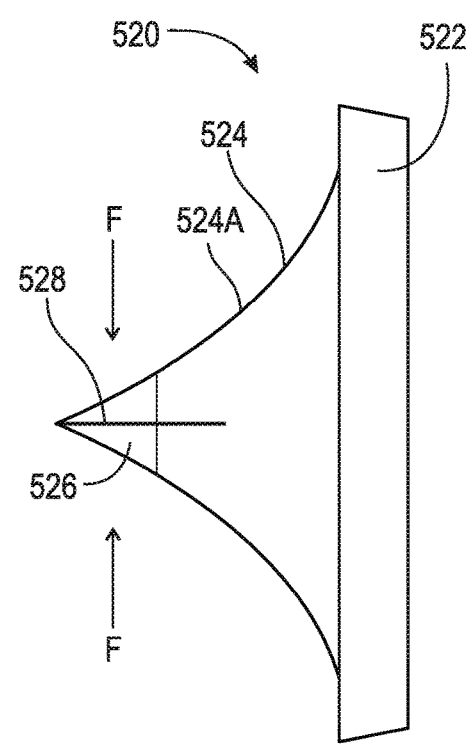
FIG. 11B is a side elevational view of the u-cup membrane valve shown in FIG. 11A.
Figure 11C:
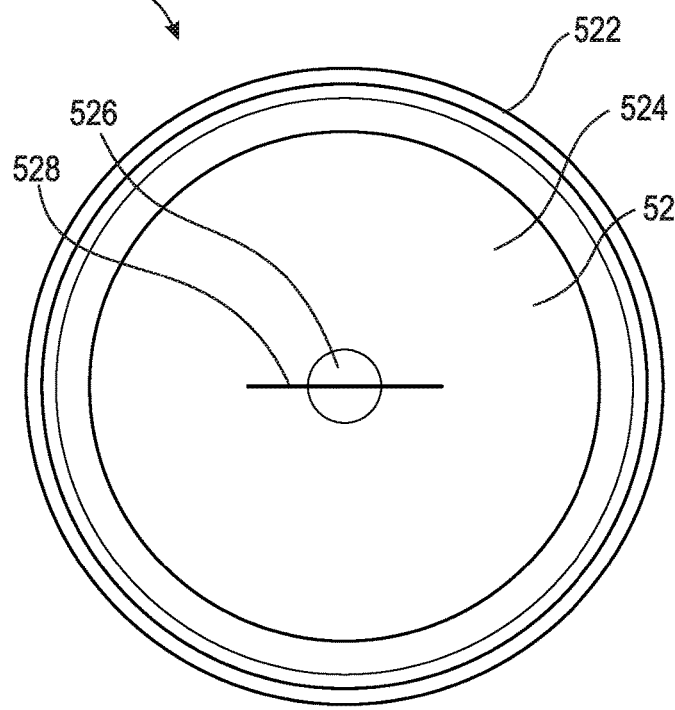
FIG. 11C is a front elevational view of the u-cup membrane valve shown in FIG. 11A.
Figure 11D:
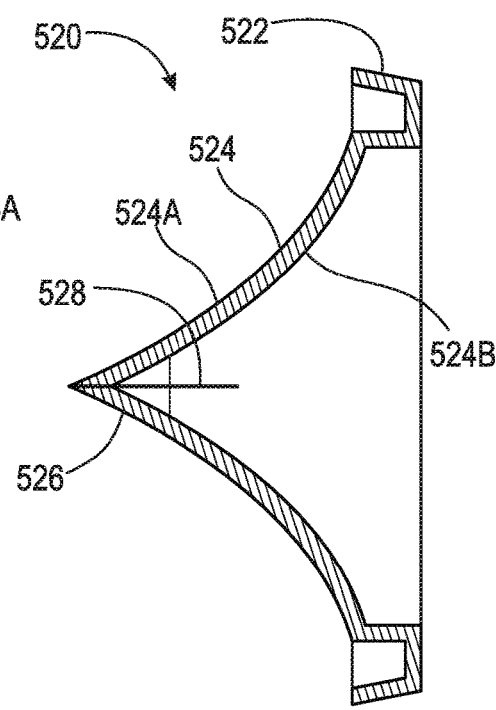
FIG. 11D is a cross-sectional view of the u-cup membrane valve taken generally along line 11D-11D in FIG. 11A.

FIG. 11A is a perspective view of u-cup membrane valve 520. FIG. 11B is a side elevational view of u-cup membrane valve 520. FIG. 11C is a front elevational view of u-cup membrane valve 520. FIG. 11D is a cross-sectional view of u-cup membrane valve 520 taken generally along line 11D-11D in FIG. 11A. U-cup membrane valve 520 comprises u-cup 522 and membrane 524. U-cup 522 is a mechanical gasket in the shape of a groove; it is a loop of elastomer with a trough-shaped cross-section, designed to be seated in groove 50 and compressed during assembly between body 40 and tube end form 80. Membrane 524 extends radially inward from u-cup 522. Membrane 524 is generally formed as a conical tear drop shape, namely a conical shape with an exponential (non-linear) curvature, and comprises vertex 526. Membrane 524 further comprises slit 528 arranged at vertex 526. In some embodiments, slit 528 is linear and is capable of sealing. In some embodiments, slit 528 is non-linear. In some embodiments, membrane 524 comprises a plurality of slits. In some embodiments, the sealing member may have an "X-shaped" cross-section instead of a u-cup cross-section. In some embodiments, the sealing member may have a "K-shaped" cross-section instead of a u-cup cross-section.

Figure 12:
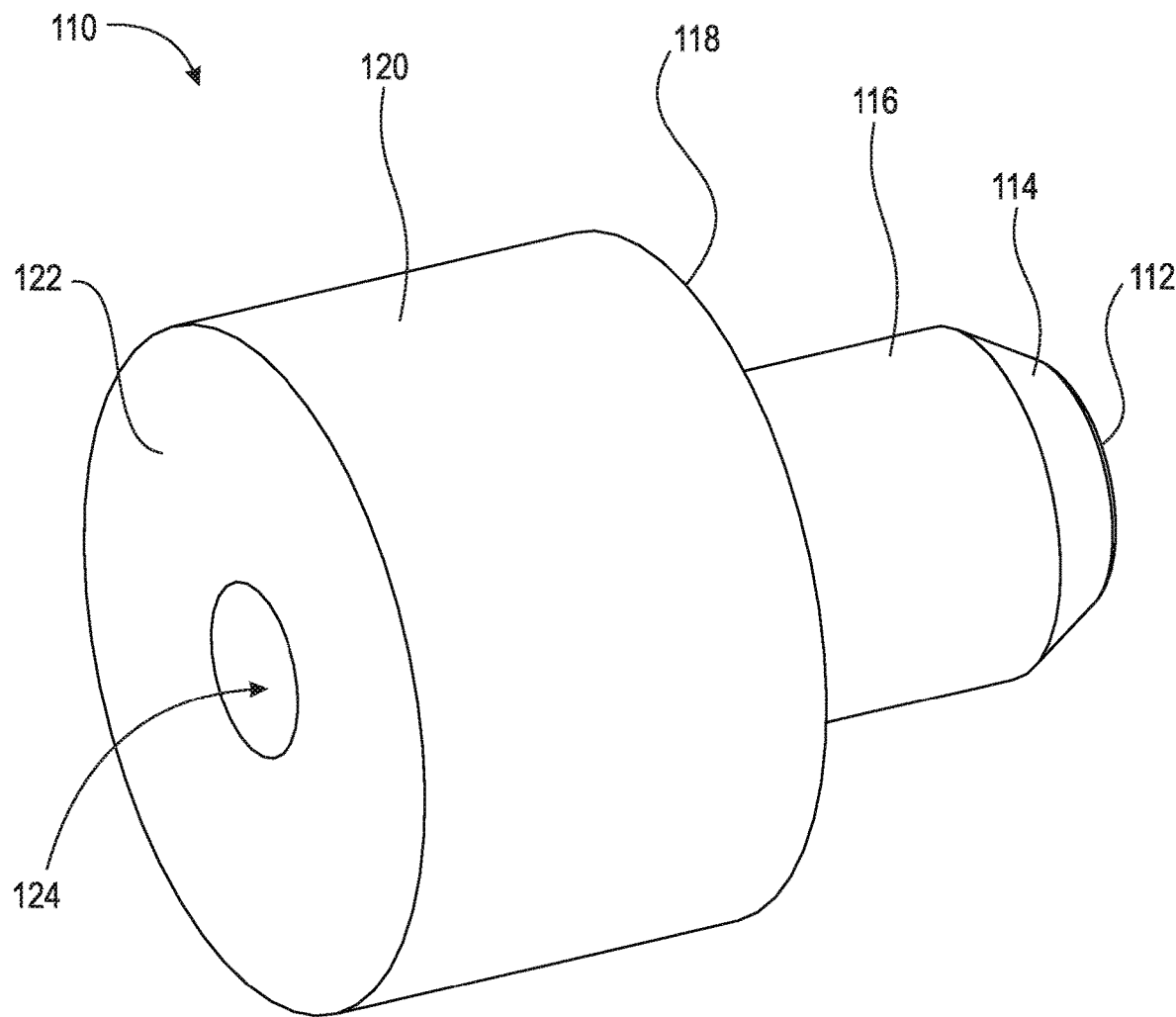
FIG. 12 is a perspective view of a probe.
Figure 13A:
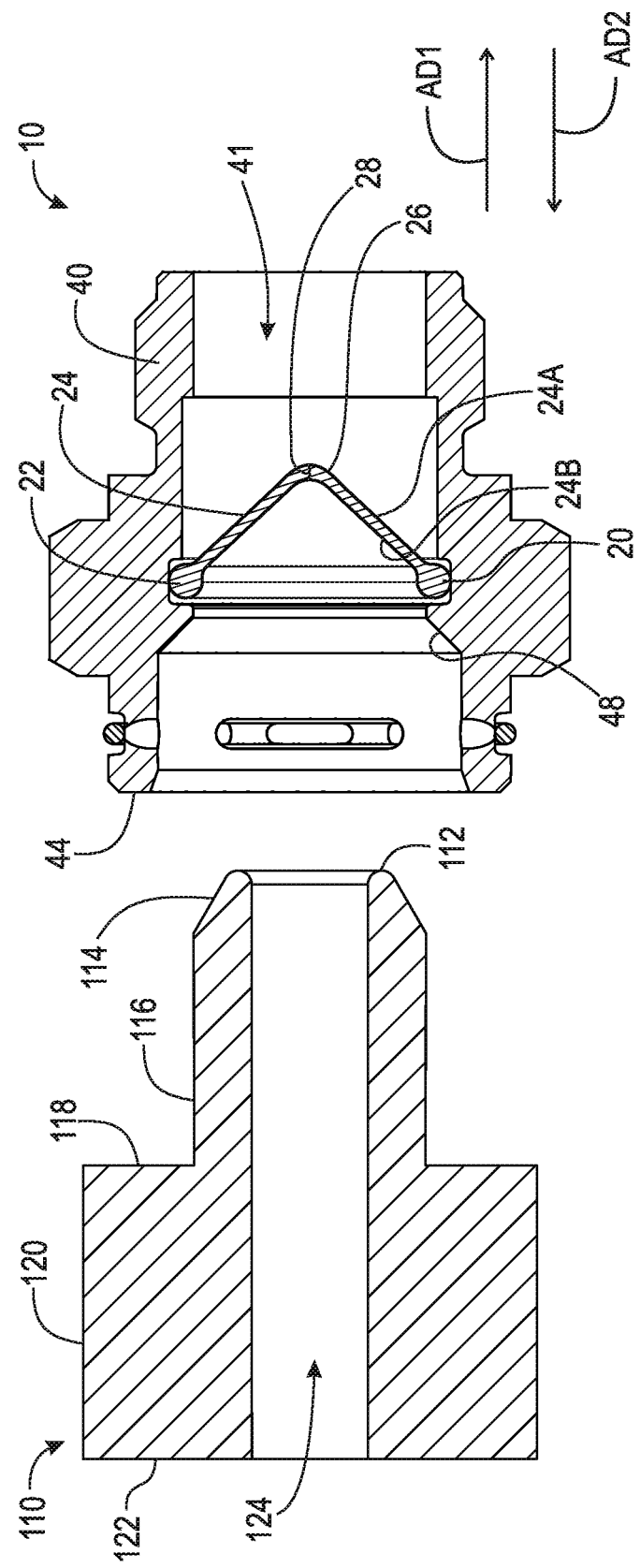
FIG. 13A is a cross-sectional view of a probe, as shown in FIG. 12, unengaged with a fluid connector.
Figure 13B:
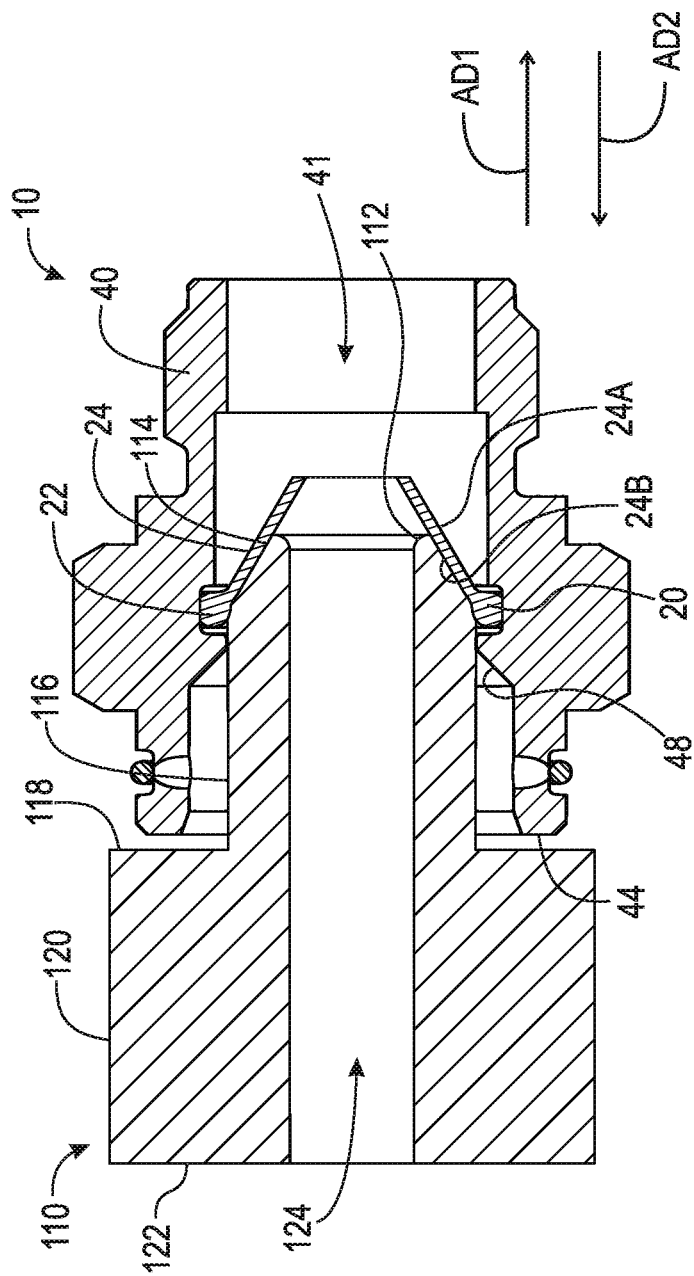
FIG. 13B is a cross-sectional view of the probe and the fluid connector, as shown in FIG. 13A, partially engaged; and, FIG. 13C is a cross-sectional view of the probe and the fluid connector as shown in FIG. 13A, fully engaged.
Figure 13C:
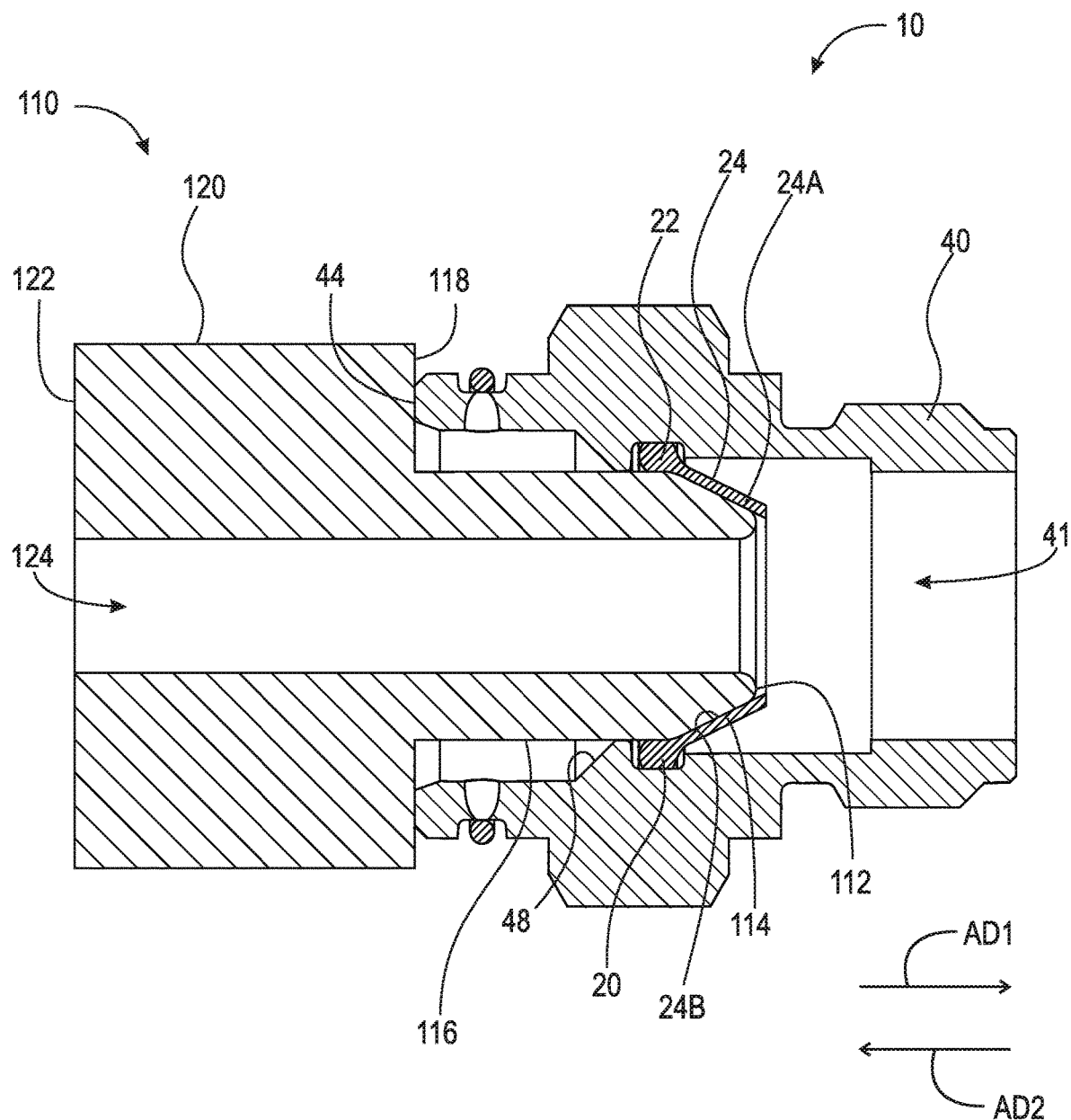

FIG. 12 is a perspective view of probe 110. FIG. 13A is a cross-sectional view of probe 110 unengaged with fluid connector 10. FIG. 13B is a cross-sectional view of probe 110 and fluid connector 10, as shown in FIG. 13A, partially engaged. FIG. 13C is a cross-sectional view of probe 110 and fluid connector 110 as shown in FIG. 13A, fully engaged. The following description should be read in view of FIGS. 12-13C.

Probe 110 is used to fill and/or evacuate the component in which fluid connector 10 is installed. Probe 110 generally comprises end 112, radially outward facing surface 114, radially outward facing surface 116, surface 118, radially outward facing surface 120, end 122, and through-bore 124. Through-bore 124 extends from end 122 to end 112. Radially outward facing surface 114 is generally frusto-conical. End 112 and radially outward facing surface 114 are arranged to contact membrane 24, specifically, surface 24B. Radially outward facing surface 114 is arranged to elastically displace membrane 24, thereby opening slit 28 to allow fluid to be pumped into the component in axial direction AD1 (i.e., to fill the component), or to allow fluid to be released from the component in axial direction AD2 (i.e., to evacuate the component).

As shown in FIG. 13A, before probe 110 is engaged with membrane 24, slit 28 is completely closed creating a seal. In FIG. 13B, probe 110 is partially engaged with membrane 24. As shown, end 112 and/or radially outward facing surface 114 abuts against surface 24B spreading slit 28, thereby allowing fluid to be pumped into the component in axial direction AD1 (i.e., to fill the component), or to allow fluid to be released from the component in axial direction AD2 (i.e., to evacuate the component), at a less than maximum flow rate. In FIG. 13C, probe 110 is fully engaged with fluid connector 10. Surface 118 abuts against end 44, and end 112 and/or radially outward facing surface 114 abuts against surface 24B fully spreading slit 28, thereby allowing fluid to be pumped into the component in axial direction AD1 (i.e., to fill the component), or to allow fluid to be released from the component in axial direction AD2 (i.e., to evacuate the component), at a maximum flow rate.

The primary purpose of O-ring membrane valve 20 is to hold fluid in the assembly or component (e.g., transmission) that fluid connector 10 is installed into. This allows the manufacturer to ship the assembly or component pre-filled with fluid (e.g., transmission fluid) to the assembly plant, or allows the assembly plant to pre-fill the sub-assembly before installing it into a vehicle. The slit-valve design of O-ring membrane valve 20 would allow the assembly plant to fill the sub-assembly through fluid connector 10 and membrane 24, specifically slit 28, using probe 110, while still allowing membrane 24 to reseal to contain the fluid after filling. Many times either the sub-assembly manufacturer or the assembly plant wants to leak test the sub-assembly before final assembly into the vehicle. The slit-valve design of the instant invention would also allow them to pressurize the system using the fill/evacuation probe in order to leak test the system, while fill allowing the membrane reseal to contain the fluid after testing.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Fluid connector
20 O-ring membrane valve
22 O-ring
24 Membrane
24A Surface
24B Surface
26 Vertex
28 Slit
40 Body
41 Through-bore
42 End
44 End
46 Radially inward facing surface
48 Radially inward facing surface
50 Groove
52 Radially outward facing surface
54 Groove
56A Hole
56B Hole
56C Hole
58 Hexagonal head
60 Radially outward facing surface
70 Snap ring
72A Protrusion
72B Protrusion
72C Protrusion
80 Tube end form
82 End
83 Section
84 Radially outward facing surface
86 Radially outward facing surface
87 Shoulder
88 Shoulder surface
89 Section
90 Radially outward facing surface
92 Groove
94 End
96 Through-bore
110 Probe
112 End
114 Radially outward facing surface
116 Radially outward facing surface
118 Surface
120 Radially outward facing surface
122 End
124 Through-bore
210 Fluid connector
220 O-ring membrane valve 222 O-ring
224 Membrane
224A Surface
224B Surface
225A Conical section
225B Conical section
225C Conical section
226 Vertex
228 Slit
310 Fluid connector
320 O-ring membrane valve
322 O-ring
324 Membrane
324A Surface
324B Surface
326 Vertex
328 Slit
410 Fluid connector
420 O-ring membrane valve
422 O-ring
424 Membrane
424A Surface
424B Surface
426 Vertex
428 Slit
510 Fluid connector
520 U-cup membrane valve
522 U-cup
524 Membrane
524A Surface
524B Surface
526 Vertex
528 Slit
F Force
AD1 Axial direction
AD2 Axial direction
RD1 Radial direction
RD2 Radial direction

What is claimed is:

1. A fluid connector, comprising:
   a body, including:
      a first through-bore; and,
      a first groove arranged circumferentially within the first through-bore, the first groove forming a first axial wall and a second axial wall spaced apart from the first axial wall; and,
   an O-ring membrane valve including:
      an O-ring arranged in the first groove, the O-ring capable of being arranged between and spaced apart from the first axial wall and the second axial wall; and,
      a resealable membrane connected to the O-ring, the resealable membrane comprising a slit;
   wherein the O-ring is operatively arranged to extend out of the first groove and into the first through-bore.

2. The fluid connector as recited in claim 1, wherein the resealable membrane is conical and comprises a vertex, the slit arranged at least partially on the vertex.

3. The fluid connector as recited in claim 1, wherein the O-ring has a round cross-sectional geometry.

4. The fluid connector as recited in claim 1, wherein the O-ring has a torus geometry.

5. The fluid connector as recited in claim 1, wherein the body further comprises:
   a radially outward facing surface including a second groove; and,
   a snap ring arranged in the second groove and extending into the first through-bore.

6. The fluid connector as recited in claim 1, wherein the body is arranged for connection to a component to be filled with a fluid and the O-ring membrane valve is arranged to seal the fluid within the component.

7. The fluid connector as recited in claim 6, wherein:
   in a sealed state, the fluid exerts a force on the membrane such that the slit is sealed shut; and,
   in an unsealed state, a tube is inserted into the body to deform the membrane such that the slit is opened and the fluid may flow into or out of the component.

8. The fluid connector as recited in claim 7, wherein the tube is a tube end form, comprising:
   a second through-bore;
   a radially outward facing surface arranged to displace the membrane and open the slit; and,
   a shoulder arranged to lock into the body.

9. The fluid connector as recited in claim 8, wherein when the tube end form is fully engaged in the body:
   the radially outward facing surface compresses the O-ring in the first groove;
   the slit is fully opened and concentrically arranged around the radially outward facing surface;
   the shoulder is locked into the body; and,
   the fluid connector is in the unsealed state.

10. The fluid connector as recited in claim 7, wherein the tube is a probe, comprising:
   a second through-bore; and,
   a radially outward facing surface arranged to displace the membrane and open the slit.

11. The fluid connector as recited in claim 1, further comprising a tube end form including:
   a second through-bore;
   a radially outward facing surface arranged to displace the membrane and open the slit; and,
   a shoulder arranged to lock into the body.

* * * * *